(12) United States Patent
Chou et al.

(10) Patent No.: US 12,152,917 B2
(45) Date of Patent: Nov. 26, 2024

(54) FLOW METER AND DEVICE FOR PRODUCING ACTIVE HYDROXYL FREE RADICAL SOLUTION HAVING THE FLOW METER

(71) Applicants: Shih-Chin Chou, New Taipei (TW); Teng-Kang Chang, Zhubei (TW); Chun-Ming Chen, Hsinchu (TW)

(72) Inventors: Shih-Chin Chou, New Taipei (TW); Teng-Kang Chang, Zhubei (TW)

(73) Assignees: Shih-Chin Chou, New Taipei (TW); Teng-Kang Chang, Zhubei (TW); Chun-Ming Chen, Hsinchu (TW)

( * ) Notice: Subject to any disclaimer, the term of this patent is extended or adjusted under 35 U.S.C. 154(b) by 161 days.

(21) Appl. No.: 17/866,042

(22) Filed: Jul. 15, 2022

(65) Prior Publication Data

US 2024/0019284 A1    Jan. 18, 2024

(51) Int. Cl.
*G01F 1/34* (2006.01)
*G01L 9/02* (2006.01)

(52) U.S. Cl.
CPC .  *G01F 1/34* (2013.01); *G01L 9/02* (2013.01)

(58) Field of Classification Search
CPC .................................... G01L 9/02; G01F 1/34
USPC .......................................... 73/861.21, 861.22
See application file for complete search history.

(56) References Cited

U.S. PATENT DOCUMENTS

| | | | | |
|---|---|---|---|---|
| 5,908,990 A | * | 6/1999 | Cummings | G01F 1/3218 73/861.42 |
| 7,007,556 B2 | * | 3/2006 | Keita | G01F 1/88 73/861.22 |
| 7,726,201 B2 | * | 6/2010 | Mattar | G01F 1/3209 73/861.24 |
| 7,895,904 B2 | * | 3/2011 | Matsubara | G01F 1/3259 73/204.21 |
| 8,590,561 B2 | * | 11/2013 | Igarashi | G05D 7/0635 137/487 |
| 9,322,683 B2 | * | 4/2016 | Brosnihan | G01F 1/3259 |
| 10,274,351 B2 | * | 4/2019 | Brosnihan | G01F 1/3259 |
| 2009/0049926 A1 | * | 2/2009 | Mattar | G01F 7/005 73/861.24 |
| 2012/0192657 A1 | * | 8/2012 | Gossner | G01F 1/3287 73/861.22 |
| 2014/0041459 A1 | * | 2/2014 | Reese | H04B 1/525 73/861.18 |
| 2016/0202095 A1 | * | 7/2016 | Brosnihan | G01F 1/86 29/428 |

\* cited by examiner

*Primary Examiner* — John Fitzgerald
(74) *Attorney, Agent, or Firm* — Burris Law, PLLC

(57) ABSTRACT

A flow meter includes a meter body and a pressure sensor. The meter body has a liquid impact surface, a sensing surface opposite to the liquid impact surface, and a mounting hole extending from the sensing surface toward the liquid impact surface. The mounting hole is a blind hole. The pressure sensor is mounted in the mounting hole, and has a resistance value that can be measured and that can be changed correspondingly with a change in liquid pressure caused by a change in flow rate. A device for producing an active hydroxyl free radical solution is also disclosed.

11 Claims, 8 Drawing Sheets

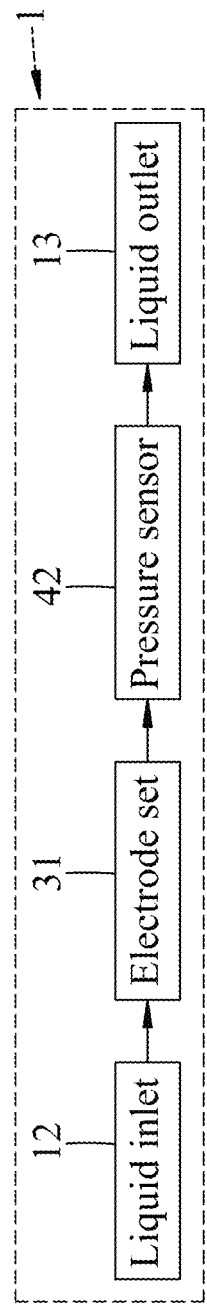
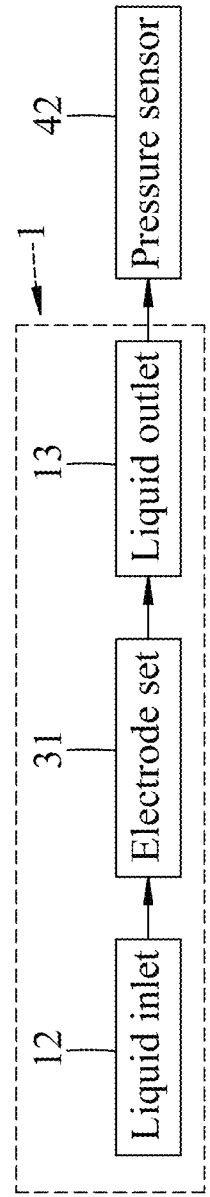

FLOW METER AND DEVICE FOR PRODUCING ACTIVE HYDROXYL FREE RADICAL SOLUTION HAVING THE FLOW METER

FIELD

The disclosure relates to a flow meter and a device for producing an active hydroxyl free radical solution and having the flow meter.

BACKGROUND

A conventional flow meter, such as a float flow meter or rotameter, an electromagnetic flow meter, etc., is generally connected in series to a conveying pipeline to measure the flow rate of fluid in the conveying pipeline. However, the rotameter can only be installed in vertical pipeline, and cannot be used in large-diameter conveying pipeline, so that use thereof is limited; while the electromagnetic flow meter cannot measure liquid with low electrical conductivity and liquid with gas content, so that use thereof is also limited. Additionally, the rotameter and the electromagnetic flow meter have complex structures, so that, not only is the problem of blockage of flow passage easy to occur, but to miniaturize the volume thereof is also difficult. Since the measurement of flow rate can be applied to a variety of products, the industry is constantly looking for a flow meter with a simple structure and developing a flow meter that can be applied to various application products, such as a device for producing an active hydroxyl free radical solution.

SUMMARY

Therefore, an object of the present disclosure is to provide a flow meter that has a simple structure. According to one aspect of this disclosure, a flow meter suitable for incompressible fluids to flow past comprises a meter body and a pressure sensor. The meter body has a liquid impact surface, a sensing surface opposite to the liquid impact surface, and a mounting hole extending from the sensing surface toward the liquid impact surface. The mounting hole is a blind hole. The pressure sensor is mounted in the mounting hole, and has a resistance value that is configured to be measured and that is configured to be changed correspondingly with a change in liquid pressure caused by a change in flow rate.

Another object of this disclosure is to provide a device for producing an active hydroxyl free radical solution that can control activation of a power source and that has the above flow meter.

According to another aspect of this disclosure, a device for producing an active hydroxyl free radical solution is provided. The device is suitable for receiving a conductive initial fluid and generating a sterilized fluid containing active hydroxyl free radicals. The initial fluid and the sterilized fluid are incompressible fluids. The device comprises a housing, a sterilization unit, the above flow meter, and a central control unit.

The housing defines a closed chamber and includes a partition wall dividing the closed chamber into a first chamber portion and a second chamber portion communicating with each other, a liquid inlet communicating with the first chamber portion, and a liquid outlet communicating with the second chamber portion. The liquid inlet is suitable for entry of the initial fluid into the closed chamber, while the liquid outlet is suitable for exit of the sterilized fluid from the closed chamber. The sterilization unit is disposed in the first chamber portion for electrolyzing the initial fluid so as to form the initial fluid into the sterilized fluid. The flow meter is suitable for the incompressible fluids to flow past. The central control unit is electrically connected to the sterilization unit and the pressure sensor of the flow meter, and is configured to control activation of the sterilization unit according to the resistance value.

BRIEF DESCRIPTION OF THE DRAWINGS

Other features and advantages of the disclosure will become apparent in the following detailed description of the embodiment with reference to the accompanying drawings, of which:

FIGS. 7A and 7B are flow diagrams, respectively illustrating two variations of the embodiment.

DETAILED DESCRIPTION

Figure 1:
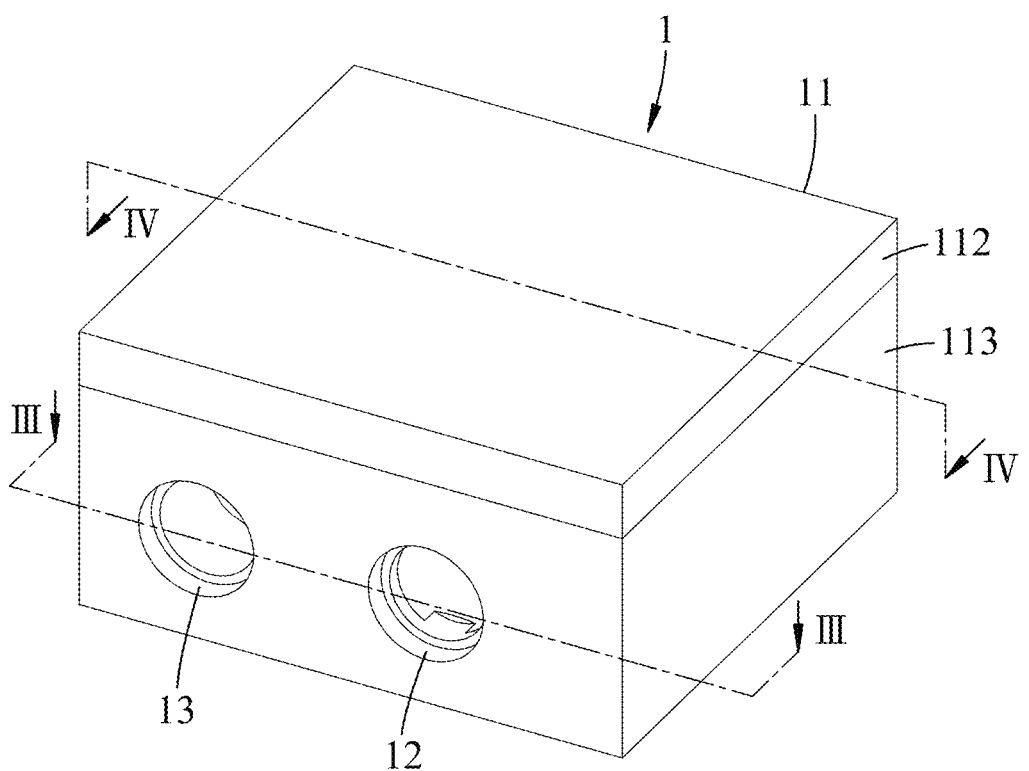
FIG. 1 is a perspective view of a device for producing an active hydroxyl free radical solution according to an embodiment of the present disclosure.
Figure 2:
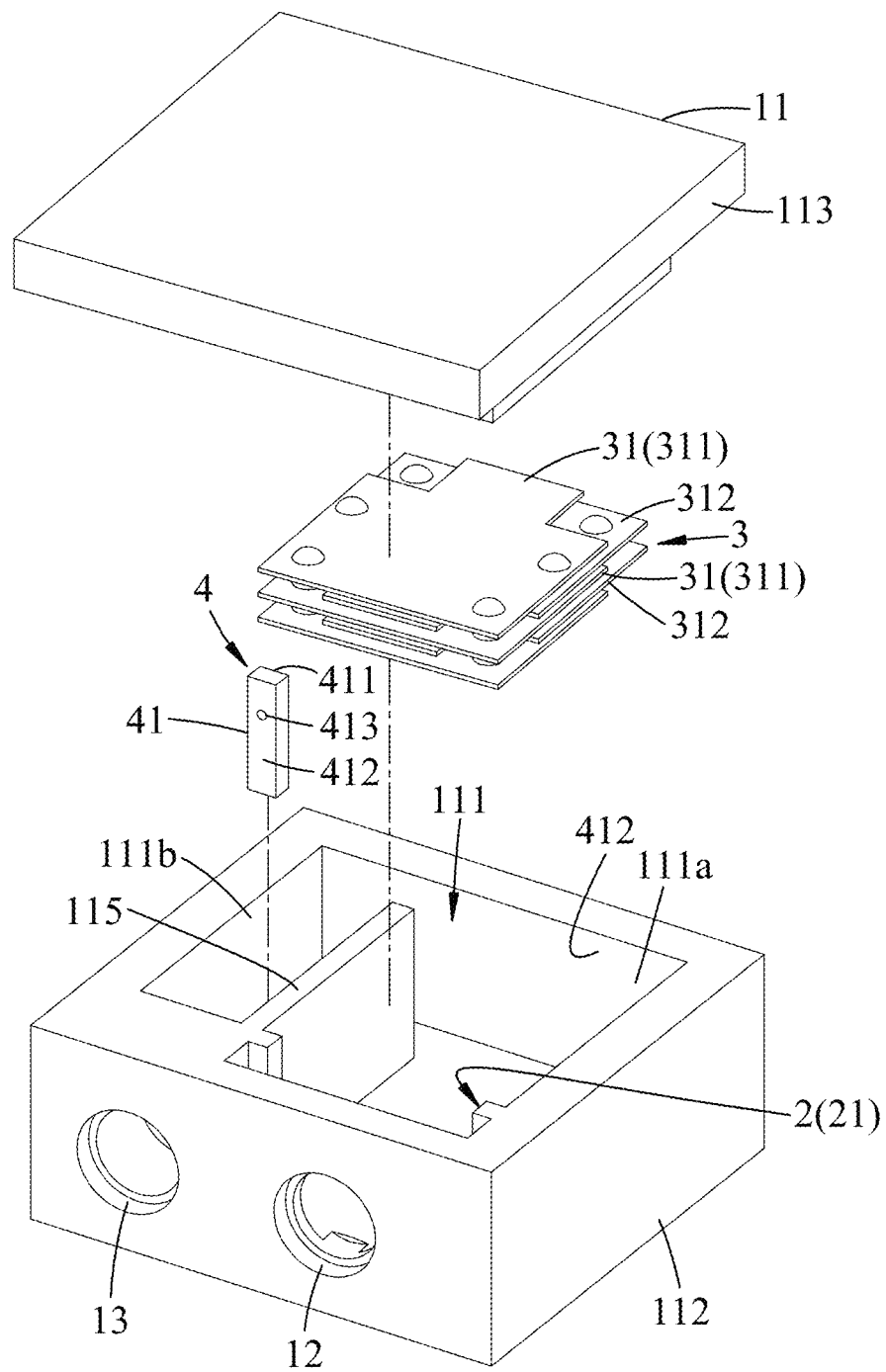
FIG. 2 is an exploded perspective view of the embodiment.

Referring to FIGS. 1 to 4, a device for producing an active hydroxyl free radical solution according to an embodiment of the present disclosure is suitable for receiving a conductive initial fluid and generating a sterilized fluid containing active hydroxyl free radicals. The initial fluid and the sterilized fluid are incompressible fluids. The device of this embodiment includes a housing 1, a liquid inlet rectifier unit 2, a sterilization unit 3, a flow meter 4, and a central control unit 5 (see FIG. 8).

The housing 1 includes a main body 112, a top cover 113 mounted on top of the main body 112 and cooperating with the same to define a closed chamber 111, a partition wall 115 dividing the closed chamber 111 into a first chamber portion (111a) and a second chamber portion (111b) communicating with each other, a liquid inlet 12 communicating with the first chamber portion (111a), and a liquid outlet 13 communicating with the second chamber portion (111b). The liquid inlet 12 is suitable for entry of the initial fluid into the closed chamber 111, while the liquid outlet 13 is suitable for exit of the sterilized fluid from the closed chamber 111. It is worth to mention herein that the liquid inlet 12 is suitable to be connected to an inlet pipeline (not shown), while the liquid outlet 13 is suitable to be connected to an outlet pipeline (not shown). The inlet pipeline may be a water pipe connected to a faucet, while the outlet pipeline may be a water pipe connected to, for example, a container. Any installation position of this disclosure is acceptable as long as the initial fluid can pass through the device of this disclosure prior to use by the user.

The liquid inlet rectifier unit 2 includes a pair of protruding rods 21 respectively protruding from a surface of the partition wall 115 and a surface of a sidewall of the main body 112 that faces the partition wall 115 toward the first chamber portion (111a).

The sterilization unit 3 is disposed in the first chamber portion (111a), and has one end abutting against the protruding rods 21. The sterilization unit 3 is used for electrolyzing the initial fluid, and produces active hydroxyl free radicals (hydroxyl radicals) (OH) with strong oxidative activity so as to form the initial fluid into the sterilized fluid. The sterilization unit 3 includes a plurality of electrode sets 31 stacked one above the other with a space therebetween for allowing the initial fluid to flow therethrough. Each of the electrode sets 31 has an anode 311 and a cathode 312. When each electrode set 31 is energized, the anode 311 thereof will produce the active hydroxyl free radicals, while the cathode 312 thereof will produce hydrogen. Since the produced active hydroxyl free radicals are directly formed in the electrolyzed initial fluid (or the sterilized fluid), the concentration of the active hydroxyl free radicals of the sterilized fluid is high; and since the initial fluid is conductive impure water (in this embodiment, tap water), the cost of raw materials for producing the active hydroxyl free radicals is reduced, and there are no other harmful by-products produced.

The oxidizing power of the hydroxyl free radicals is strong, so that, through this strong oxidizing power, the chemical bonds of organic matter are instantaneously oxidized, and the viruses and bacteria of the genetic factors (DNA/RNA) are destroyed, thereby achieving the effect of sterilization, disinfection and decomposition of the organic matter.

Figure 3:
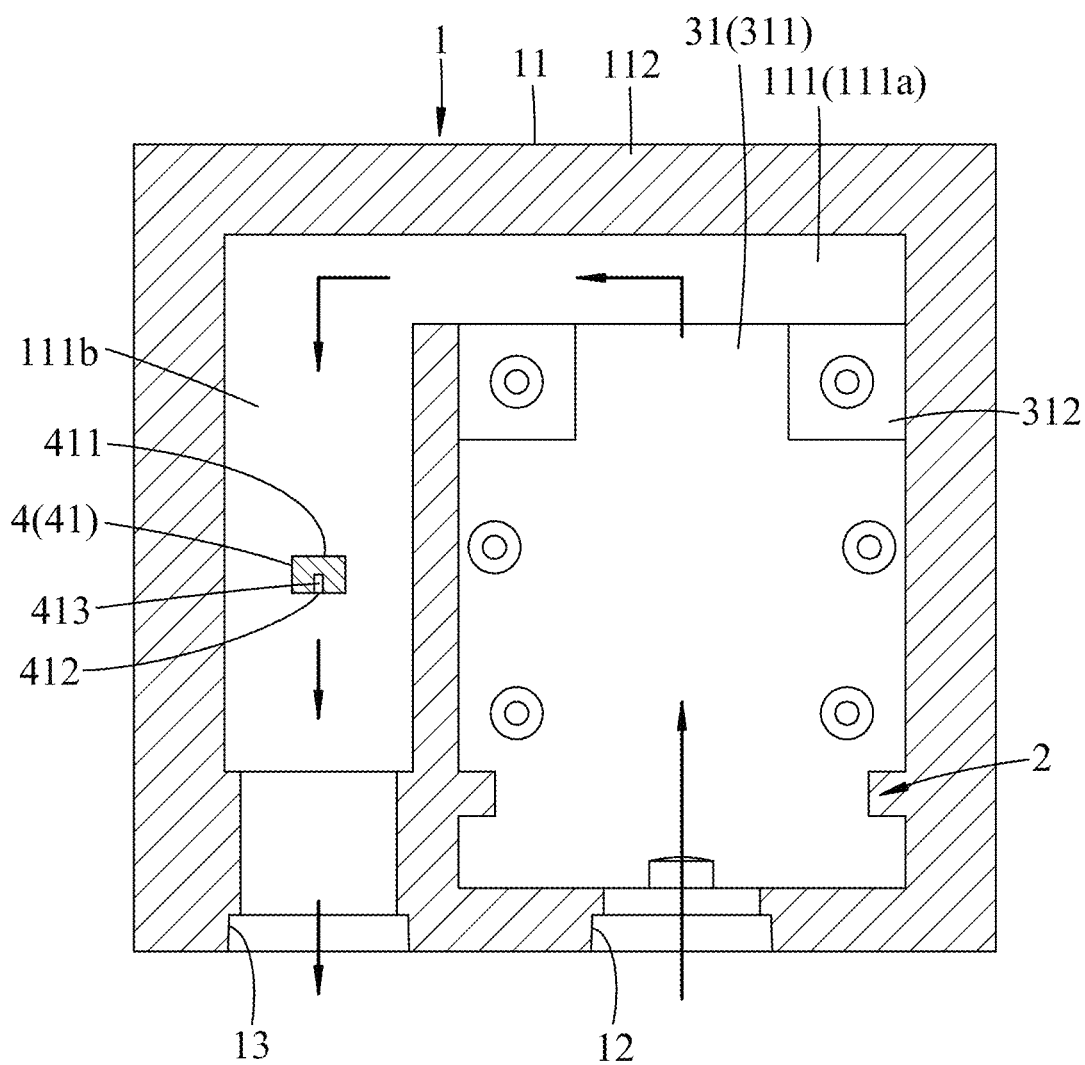
FIG. 3 is a sectional view taken along line III-III of FIG. 1.
Figure 4:
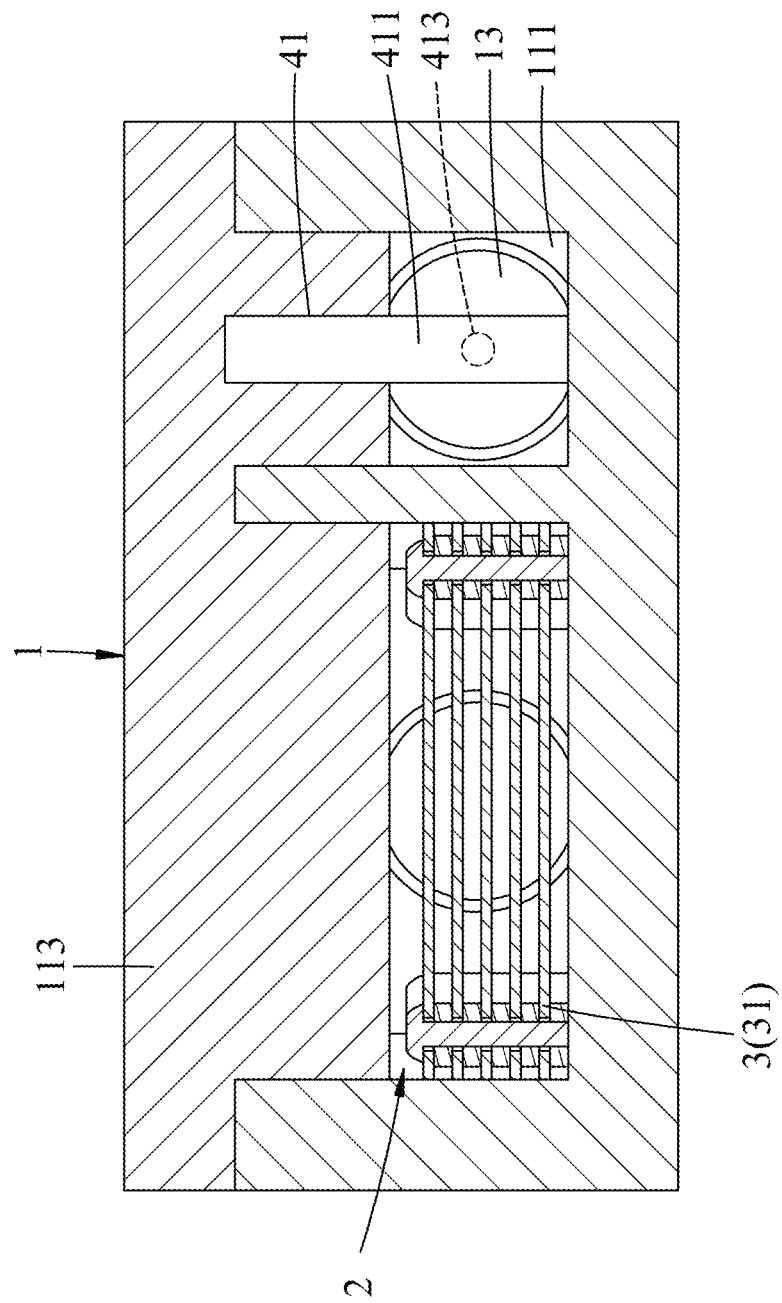
FIG. 4 is a sectional view taken along line IV-IV of FIG. 1.
Figure 5A:
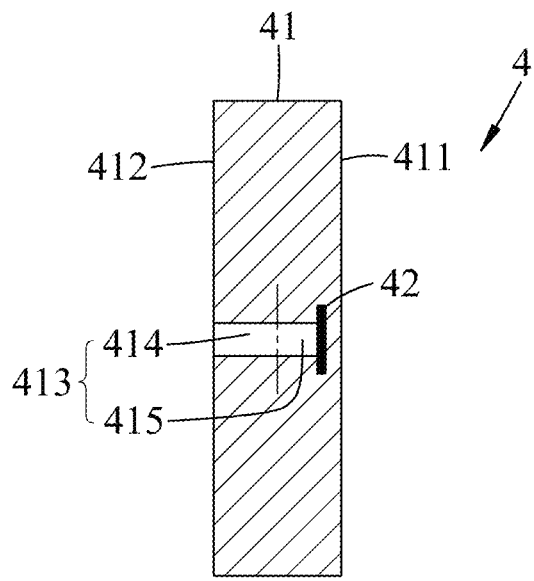
FIGS. 5A and 5B respectively illustrate two forms of a mounting hole of a flow meter of the embodiment.

Referring to FIG. 5A, in combination with FIGS. 3 and 4, the flow meter 4 includes a meter body 41 and a pressure sensor 42. The meter body 41 is a bluff body that is disposed in the second chamber portion (111b) and that has a liquid impact surface 411, a sensing surface 412 opposite to the liquid impact surface 411, and a mounting hole 413 extending from the sensing surface 412 toward the liquid impact surface 411. The mounting hole 413 is a blind hole. The sterilized fluid flows past the flow meter 4 in a flow direction from the liquid impact surface 411 toward the sensing surface 412.

Figure 5B:
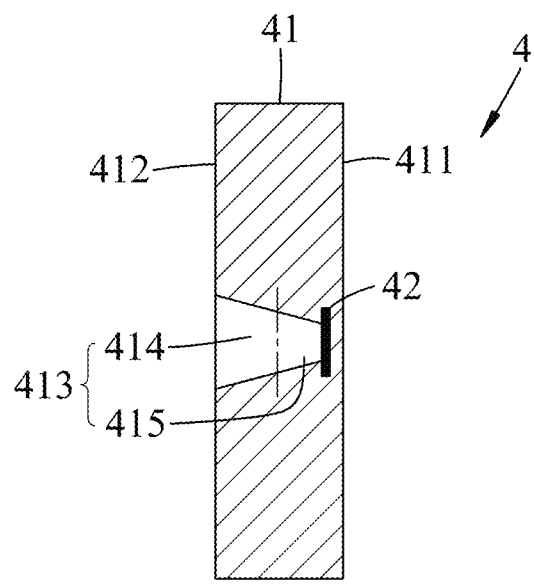

The mounting hole 413 has a first section 414 proximate to the sensing surface 412, and a second section 415 connected to the first section 414 and distal to the sensing surface 412. The first section 414 has an average hole diameter not less than an average hole diameter of the second section 415. In one aspect of this embodiment, the average hole diameter of the first section 414 is equal to the average hole diameter of the second section 415, as shown in FIG. 5A, so that the mounting hole 413 has a uniform hole diameter. In another aspect of this embodiment, the average hole diameter of the first section 414 is larger than the average hole diameter of the second section 415, as shown in FIG. 5B, so that the mounting hole 413 is a tapered hole that tapers from the sensing surface 412 toward the liquid impact surface 411. The shape of the mounting hole 413 is not limited to the aforesaid disclosure, as long the mounting hole 413 is a blind hole, any shape thereof is acceptable.

The pressure sensor 42 is mounted in the mounting hole 413 at a location adjacent to the second section 415, and has a resistance value that can be measured and that can be changed correspondingly with a change in liquid pressure caused by a change in flow rate. That is, the resistance value is related to the flow rate.

When the active sterilized fluid flows into the second chamber portion (111b), it will encounter the meter body 41 (bluff body) and flow along the liquid impact surface 411 thereof, after which it will separate from the liquid impact surface 411 to generate a turbulent flow. At this time, the sensing surface 412 will be subjected to a back pressure of the active sterilized fluid. Further, the greater the flow of the sterilized fluid, the greater also is the back pressure. The pressure sensor 42 changes its resistance value when subjected to the back pressure. When the back pressure is large, the pressure sensor 42 connected to a voltage will output more electric charge, so that the measured resistance value thereof is low. That is, when the flow rate of the sterilized fluid is large, the back pressure generated is also large, while the resistance value of the pressure sensor 42 is small.

Moreover, since the edges of the sensing surface 412 will be affected by the turbulent flow, the disposed location of the mounting hole 413 is preferably in the middle of the sensing surface 412. Through this, the magnitude of the pressure change corresponding to the flow rate can be increased and can be easily measured through the flow meter 4.

Regarding a fluid flowing past a bluff body and generating a back pressure, it is known that, when the fluid first encounters the front of a cylinder, its kinetic energy will be converted into pressure, so it will be greater than the reference pressure to generate a positive pressure. However, after the fluid flows past the cylinder for a period of time, due to the action of viscous force, the phenomenon of fluid separation and acceleration will occur on the surface, and vortex overflow will appear on both sides of the cylinder, resulting in a wake area or a negative pressure area behind the cylinder. Since the fluids used in this disclosure are incompressible (the density does not change due to pressure change), the generated back pressure is significantly greater than for compressible fluids, and is easier to measure through the flow meter 4.

Figure 8:
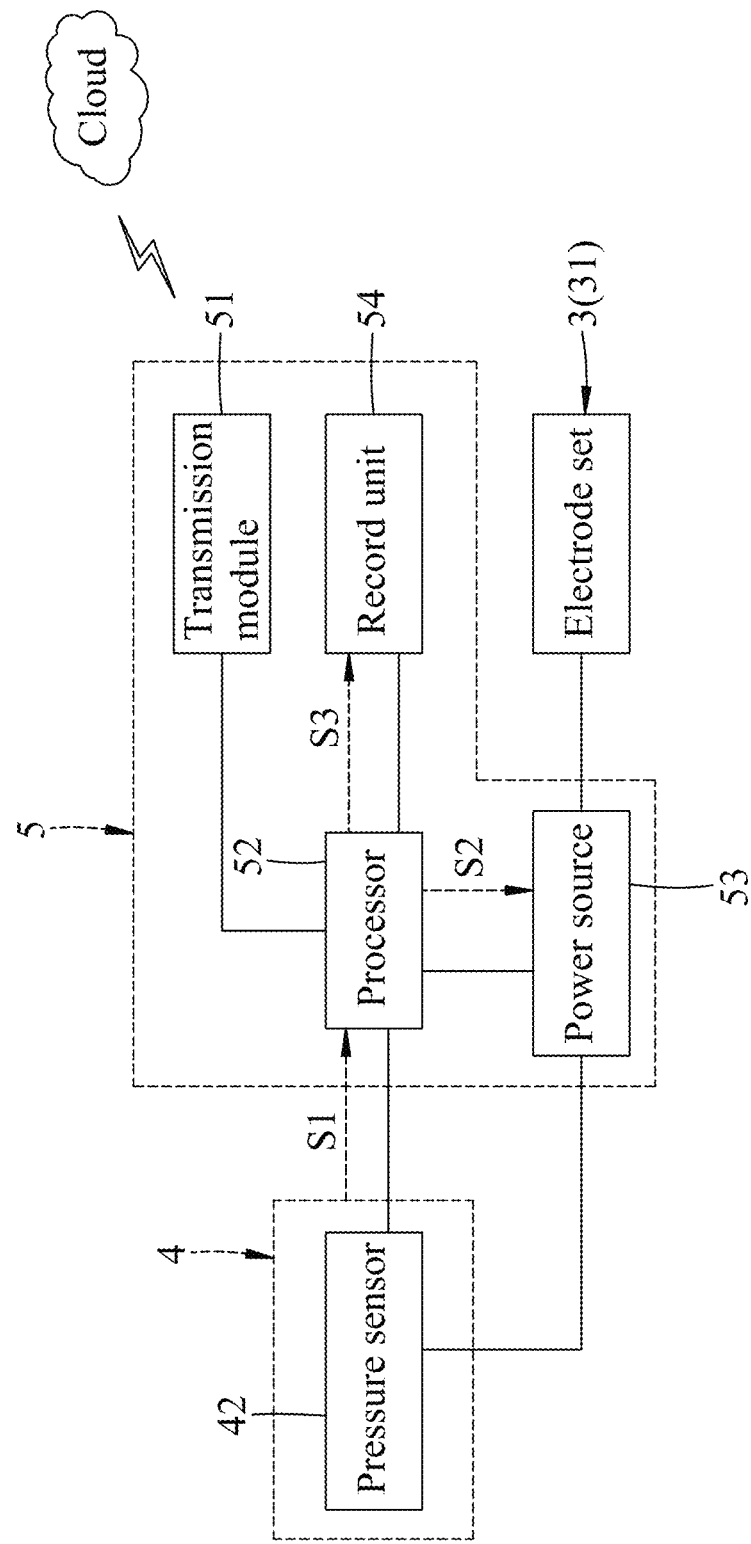
FIG. 8 is a signal-flow graph of the embodiment.

Referring to FIG. 8, the pressure sensor 42 can be additionally connected to an electronic circuit (not shown) for converting the resistance value to voltage, so that the pressure sensor 42 can output a voltage signal (S1). Specifically, in this embodiment, a processor 52 and a power source 53 that will be described later and the pressure sensor 42 can form the electronic circuit. The power source 53 provides a voltage source to the electronic circuit, and the voltage signal (S1) is a voltage value at the junction of the pressure sensor 42 and the processor 52. The processor 52 can obtain a partial pressure of the pressure sensor 42 (when the processor 52 is grounded) by subtracting the voltage value of the voltage signal (S1) from the total voltage, or the voltage value of the voltage signal (S1) is the partial pressure of the pressure sensor 42 (when the pressure sensor 42 is grounded). It should be noted that the voltage source in the electronic circuit can be provided by, but not limited to, the power source 53. Further, the measuring of the partial pressure of the pressure sensor 42 is not limited to the foregoing method.

The central control unit 5 is electrically connected to the electrode sets 31 and the pressure sensor 42, and includes a transmission module 51, the processor 52, the power source 53, and a record unit 54. The power source 53 is electrically connected to the processor 52, the pressure sensor 42 and the sterilization unit 3 for supplying electrical power thereto. The record unit 54 is communicatingly connected to the transmission module 51. The transmission module 51 is used for receiving the voltage signal (S1) and sending it to the processor 52. The processor 52 pre-stores a flow rate relationship formula which describes the relationship between the resistance value (or voltage value) and the flow rate. By measuring the resistance value (or voltage value) of the pressure sensor 42 at a known flow rate, and by a fitting method, the flow rate relationship formula can be obtained. In this embodiment, when the hole diameter of the mounting hole 413 is uniform (see FIG. 5A) and is 3 mm, the data of the flow rate and the resistance value are as below. Those people with ordinary skill in the art can understand based on the above description how to obtain the flow rate relationship formula when the hole diameter of the mounting hole 413 is changed. Thus, the aspect of this embodiment is not limited to the following data, and the flow rate relationship formula can also be stored in a storage module (not shown).

| Hole diameter-3 mm | |
|---|---|
| Flow rate (or Flow velocity) v(cm/sec) | Resistance value of pressure sensor R(kΩ) |
| 0 | 973.5 |
| 15 | 960 |
| 20 | 940 |
| 25 | 920 |
| 30 | 894 |
| 40 | 839.7 |
| 50 | 792 |

Figure 6:
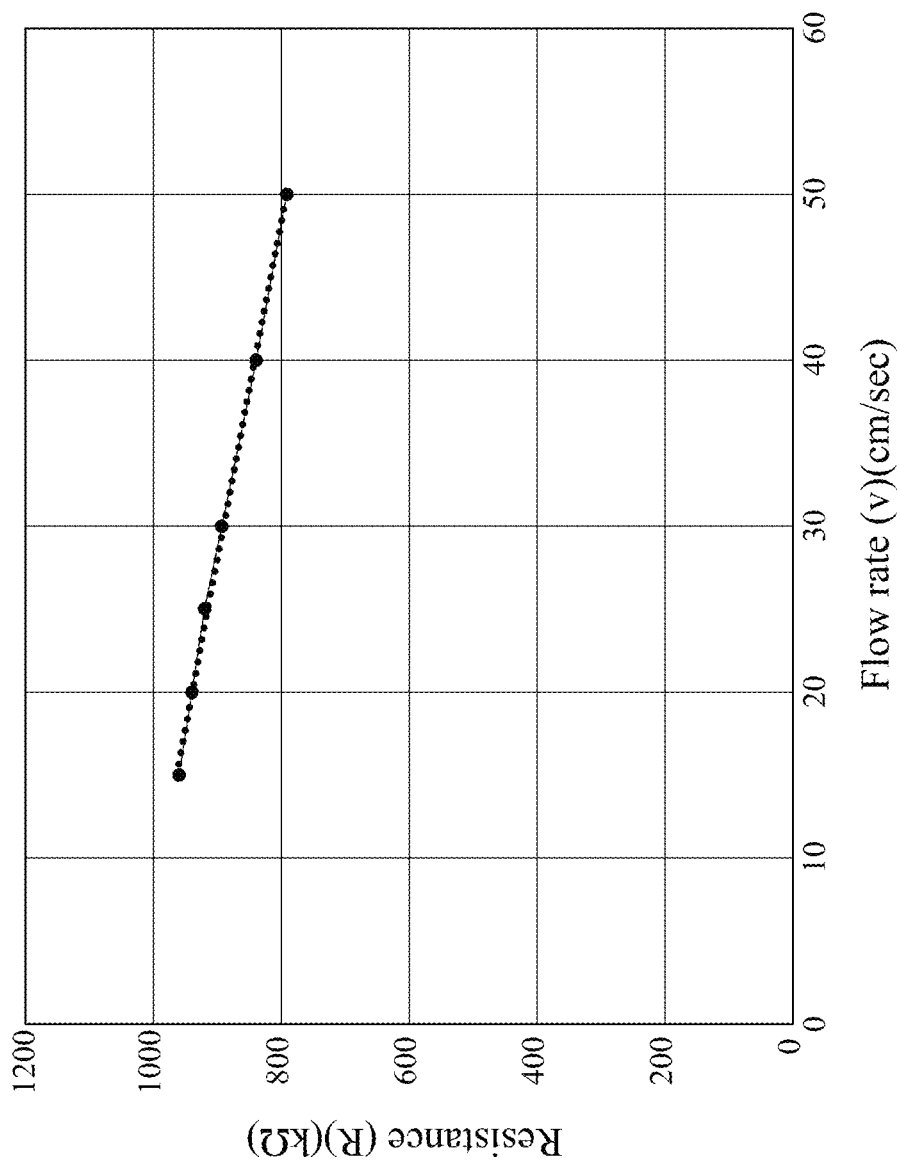
FIG. 6 is a data graph, illustrating resistance value versus flow rate of the embodiment.

FIG. 6 is obtained after plotting the data in the above table. It can be found that the resistance value (R) and the flow rate or flow velocity (v) of the pressure sensor 42 has a linear relationship, and the slope is negative. The flow rate relationship formula is: $R=(-4.8976v)+1037.9$.

It is worth noting that, when the flow meter 4 shown in FIG. 5B is used, in which the average hole diameter of the second section 415 is smaller than the average hole diameter of the first section 414, under the same flow rate, the pressure generated by the sterilized fluid on the pressure sensor 42, which is proximate to the second section 415, is greater than the pressure on the sensing surface 412 which is proximate to the first section 414. Hence, the resistance value of the pressure sensor 42 changes more obviously with the flow rate. In this way, the absolute value of the slope can be increased, thereby improving the sensitivity of sensing.

After the processor 52 receives the voltage signal (S1), a control signal (S2) is output to energize and activate the electrode sets 31 of the sterilization unit 3, so that the sterilization unit 3 can electrolyze the initial fluid flowing therethrough. Further, the processor 52 can also control the voltage (and/or current) supply to the electrode sets 31 according to the voltage signal (S1) (signal related to the flow rate) so as to adjust the efficient generation of the active hydroxyl free radicals by the electrode sets 31. Through this, the effect of adjusting the concentration of the active hydroxyl free radicals according to the flow rate is achieved.

After the processor 52 receives the voltage signal (S1), through the flow rate relationship formula and the known resistance value, the corresponding flow rate can be calculated. After the processor 52 has calculated the flow rate, it will output a flow rate information (S3) through the transmission module 51 to the record unit 54 for storage. The flow rate information (S3) can further include at least one of time information and the concentration of the active hydroxyl free radicals (measured by a concentration sensor).

The detailed implementation process of this disclosure is described as follows:

1. The Disposed Location of the Pressure Sensor 42 (See FIGS. 3, 7A and 7B)

It is worth to mention herein that, in this embodiment, with reference to FIG. 7A, the pressure sensor 42 is disposed between the liquid inlet 12 and the liquid outlet 13 within the housing 1. That is, the initial fluid enters the liquid inlet 12 and is discharged from the liquid outlet 13 after passing through the liquid inlet rectifier unit 2, the sterilization unit 3 and the flow meter 4. In another variation of this embodiment, with reference to FIG. 7B, the pressure sensor 42 is disposed after the liquid outlet 13. That is, the pressure sensor 42 is located outside of the housing 1. Further, the flow meter 4 may be disposed in front of the liquid inlet 12. That is, the pressure sensor 42 is also suitable for having a resistance value that can be measured when the initial fluid flows through it and that can change liquid pressure as the flow rate changes.

2. Activation of the Sterilization Unit 3 (See FIGS. 3, 4 and 8)

When the initial fluid flows past the flow meter 4, the pressure sensor 42 will output the voltage signal (S1) to the processor 52 of the central control unit 5. After the processor 52 receives the voltage signal (S1), it will control the power source 53 to supply electrical power to the sterilization unit 3 so as to activate the electrode sets 31. When the electrode sets 31 are activated, they will start to electrolyze the initial fluid flowing therethrough and form it into the sterilized fluid. As such, since the electrode sets 31 are activated after the initial fluid initially flowing past the flow meter 4 is detected, the flow meter 4 may serve to control the operation of the electrode sets 31.

3. Function of the Flow Meter 4

When the sterilized fluid flows to the flow meter 4, the pressure sensor 42 will output the voltage signal (S1) related to the resistance value to the central control unit 5, and the processor 52, in turn, calculates the corresponding flow rate according to the flow rate relationship formula and the known resistance value.

In other variations of this embodiment, the flow meter 4 may also be disposed near the liquid inlet 12 to measure the flow rate supplied by a liquid supply unit to the chamber 111.

Further, the processor 52 can send the flow rate information (S3) to the cloud through the transmission module 51 for storage, or the processor 52 can send the flow rate information (S3) (over a period of time) stored in the record unit 54 through the transmission module 51 to the cloud for storage.

Through the aforesaid description, the advantages of this embodiment can be summarized as follows:

1. With the provision of the meter body 41 and the location of the pressure sensor 42 in t mounting hole 413 of the meter body 41, the flow rate can be determined through the resistance value that changes the water pressure as the flow rate changes, so that the effect of simple structure can be achieved. Further, through the central control unit 5 which can control the activation of the sterilization unit 3 according to the resistance value, the effect of controlling the operation of the sterilization unit 3 can be achieved.

2. Through the processor 52 that controls the voltage (and/or current) supply of the electrode sets 31 of the sterilization unit 3 according to the voltage signal (S1), the effect of adjusting the concentration of the active hydroxyl free radicals according to the flow rate can be achieved.

3. Since the initial fluid will be restricted within the closed chamber 111, it can be ensured that the active hydroxyl free radicals generated by the sterilization unit 3 can completely exist in the fluid.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A flow meter suitable for incompressible fluids to flow past, comprising:
    a meter body having a liquid impact surface, a sensing surface opposite to said liquid impact surface, and a mounting hole extending from said sensing surface toward said liquid impact surface, said mounting hole being a blind hole; and
    a pressure sensor mounted in said mounting hole and having a resistance value that is configured to be measured and that is configured to be changed correspondingly with a change in liquid pressure caused by a change in flow rate.

2. The flow meter as claimed in claim 1, wherein said mounting hole has a first section proximate to said sensing surface, and a second section connected to said first section and distal to said sensing surface, said first section having an average hole diameter not less than an average hole diameter of said second section.

3. The flow meter as claimed in claim 2, wherein said mounting hole is a tapered hole that tapers from said sensing surface toward said liquid impact surface.

4. A device for producing an active hydroxyl free radical solution and suitable for receiving a conductive initial fluid and generating a sterilized fluid containing active hydroxyl free radicals, the initial fluid and the sterilized fluid being incompressible fluids, said device comprising:
    a housing defining a closed chamber and including a partition wall dividing said closed chamber into a first chamber portion and a second chamber portion communicating with each other, a liquid inlet communicating with said first chamber portion, and a liquid outlet communicating with said second chamber portion, said liquid inlet being suitable for entry of the initial fluid into said closed chamber, said liquid outlet being suitable for exit of the sterilized fluid from said closed chamber;
    a sterilization unit disposed in said first chamber portion for electrolyzing the initial fluid so as to form the initial fluid into the sterilized fluid;
    a flow meter as claimed in claim 1 that is suitable for the incompressible fluids to flow past; and
    a central control unit that is electrically connected to said sterilization unit and said pressure sensor of said flow meter and that is configured to control activation of said sterilization unit according to the resistance value.

5. The device as claimed in claim 4, wherein said mounting hole is a tapered hole that tapers from said sensing surface toward said liquid impact surface.

6. The device as claimed in claim 4, wherein said central control unit includes a processor electrically connected to said sterilization unit and said pressure sensor, and a power source electrically connected to said processor, said pressure sensor and said sterilization unit for supplying electrical power thereto, said processor controlling said power source to output electrical power to said sterilization unit according to the resistance value so as to activate said sterilization unit.

7. The device as claimed in claim 4, wherein the initial fluid at least passes through said sterilization unit and said flow meter from said liquid inlet.

8. The device as claimed in claim 4, further comprising a record unit, said central control unit further including a transmission module communicatingly connected to said record unit, wherein, when said processor has calculated a flow rate, said processor will output a flow rate information to said record unit through said transmission module for storage.

9. The device as claimed in claim 4, wherein said central control unit further stores a flow rate relationship formula for calculating a flow rate with a known resistance value.

10. The device as claimed in claim 9, wherein the flow rate and the resistance value have a linear relationship.

11. The device as claimed in claim 10, wherein a slope of the flow rate and the resistance value is negative.

* * * * *